A. SCHILLING.
CAGE RING FOR BALL BEARINGS.
APPLICATION FILED AUG. 1, 1911.
1,013,518.                      Patented Jan. 2, 1912.
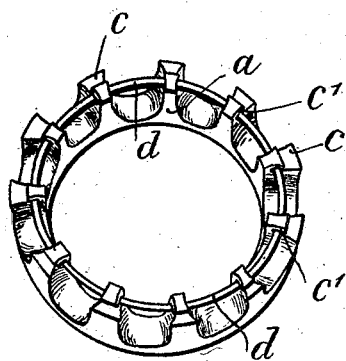
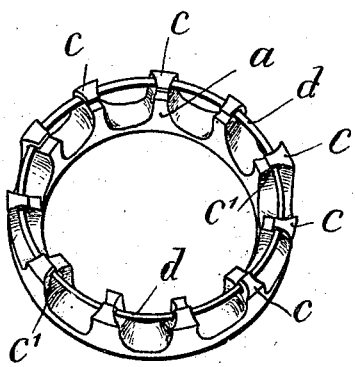
WITNESSES
Arthur S. Pettit
Leon Spring
INVENTOR
August Schilling
By Wallace White
ATTY.

UNITED STATES PATENT OFFICE.

AUGUST SCHILLING, OF BIELEFELD, GERMANY, ASSIGNOR TO BIELEFELDER MASCHINENFABRIK VORMALS DÜRKOPP & CO., OF BIELEFELD, GERMANY.

CAGE-RING FOR BALL-BEARINGS

1,013,518.      Specification of Letters Patent.      Patented Jan. 2, 1912.

Application filed August 1, 1911. Serial No. 641,732.

*To all whom it may concern:*

Be it known that I, AUGUST SCHILLING, subject of the German Emperor, residing at Bielefeld, Germany, have invented new and useful Improvements in Cage-Rings for Ball-Bearings, of which the following is a specification.

The present invention relates to a one-sided cage-ring for ball bearings with fixed partitions separating the various hollowed out cages. The cages are arranged as closely together as possible leaving only narrow partitions between them, so that as large a number of balls as possible will find room in the bearing and as great a capacity as possible is given to the bearing.

The characteristic feature of the present invention consists in that these narrow partitions serve to receive a closing elastic ring of the kind as is already known in other types of ball bearing cages. Whereas, however, in the previously known devices movable or pivotable parts were employed for holding the elastic ring or the cage-ring had to be deformed for allowing of the elastic ring being fitted, the said elastic ring is according to the present invention secured in the fixed partitions of the one-sided and one pieced cage-ring in a manner, which will safeguard the absolute steadiness and accuracy of its position. The fixing partitions remaining between the individual cages are namely undercut, and in these undercut recesses the elastic ring will fit expanding outwardly or inwardly.

In the drawing a cage ring for a ball bearing is shown in two perspective views of which Figure 1 is a view with the recesses opening radially outward, and Fig. 2 is a view with the recesses opening radially inward. The known two runner rings employed together with it for forming the complete bearing have been omitted.

The cage ring consists in both figures of a disk $a$, in which the individual cages have been cut out by milling or any other suitable method. The partitions $c$ remaining between the cages are undercut vertically or almost vertically to the longitudinal extension of the partitions. Into these undercut recesses $c^1$ is placed in Fig. 1 an elastic ring $d$ expanding inwardly, which ring will unalterably maintain its position to the balls which it prevents from falling out of the cages and consequently out of the ball bearing.

The balls are placed in known manner first into the runner rings, then the one-sided cage-ring is fitted, which will receive the balls, whereupon the cages are closed by the elastic ring being placed into position.

The arrangement according to Fig. 2 differs from that according to Fig. 1 by that the undercuts extend from inside toward outside and therefore in this case an elastic ring will be employed which expands outwardly.

The combination of the one-sided cage-ring with hollowed cages and the elastic ring, which can be placed in position without any need of calking or riveting of parts of the cage-ring is particularly favorable for the assembling and dismantling of the ball-bearing.

The operation is very quickly and easily carried out and nevertheless the relative positions of the cage ring, for the balls and the elastic ring are absolutely safeguarded.

I claim:

A one sided cage ring for ball bearings comprising a circular member having a plurality of ball receiving cavities, and fixed axially disposed partitions between said cavities, said partitions having their outer and inner portions respectively of different elevation, the elevated portions overhanging the depressed portions and forming laterally opening undercut recesses, and an elastic ring inserted in said recesses by distortion from its normal position.

In testimony whereof I have signed my name to this specification in the presence of two subscribing witnesses.

AUGUST SCHILLING.

Witnesses:
  ROBERT THOMPSON,
  MARTA L. THOMPSON.